(12) United States Patent
Bromberg et al.

(10) Patent No.: US 7,726,265 B2
(45) Date of Patent: Jun. 1, 2010

(54) FUEL TANK SYSTEM FOR DIRECT ETHANOL INJECTION OCTANE BOOSTED GASOLINE ENGINE

(75) Inventors: Leslie Bromberg, Sharon, MA (US);
Paul N. Blumberg, Southfield, MI (US);
Daniel R. Cohn, Cambridge, MA (US);
John Heywood, Netwon, MA (US)

(73) Assignee: Ethanol Boosting Systems, LLC, Cambridge, MA (US)

( * ) Notice: Subject to any disclaimer, the term of this patent is extended or adjusted under 35 U.S.C. 154(b) by 0 days.

(21) Appl. No.: 11/684,100

(22) Filed: Mar. 9, 2007

(65) Prior Publication Data

US 2008/0053399 A1    Mar. 6, 2008

Related U.S. Application Data

(60) Provisional application No. 60/780,981, filed on Mar. 10, 2006.

(51) Int. Cl.
*F02B 43/04* (2006.01)
(52) U.S. Cl. .................... 123/1 A; 123/431; 123/198 A
(58) Field of Classification Search ................. 123/1 A, 123/431, 575, 198 A
See application file for complete search history.

(56) References Cited

U.S. PATENT DOCUMENTS

| | | |
|---|---|---|
| 2,741,230 A | 4/1956 | Reynolds |
| 3,089,470 A | 5/1963 | Payne |
| 3,106,194 A | 10/1963 | Cantwell et al. |
| 3,557,763 A | 1/1971 | Probst |
| 4,031,864 A | 6/1977 | Crothers |
| 4,056,087 A | 11/1977 | Boyce |
| 4,182,278 A | 1/1980 | Coakwell |
| 4,230,072 A | 10/1980 | Noguchi et al. |
| 4,312,310 A | 1/1982 | Chivilo' et al. |
| 4,402,296 A | 9/1983 | Schwarz |
| 4,480,616 A | 11/1984 | Takeda |
| 4,541,383 A | 9/1985 | Jessel |
| 4,594,201 A | 6/1986 | Phillips et al. |
| 4,596,277 A * | 6/1986 | Djordjevic .................... 141/98 |
| 4,721,081 A | 1/1988 | Krauja et al. |
| 4,958,598 A | 9/1990 | Fosseen |
| 4,967,714 A | 11/1990 | Inoue |
| 4,974,416 A | 12/1990 | Taylor |
| 4,993,386 A | 2/1991 | Ozasa et al. |

(Continued)

OTHER PUBLICATIONS

A. Modak and L.S. Carletto, "Engine Cooling by Direct Injection of Cooling Water," Society of Automotive Engineers, Inc., 700887.

(Continued)

*Primary Examiner*—Hai H Huynh
(74) *Attorney, Agent, or Firm*—Nields, Lemack & Frame, LLC

(57) ABSTRACT

Fuel tank system for a direct ethanol injection octane boosted gasoline engine. The system includes a gasoline engine and a main fuel tank that contains a mix of gasoline and gasoline E85. A smaller secondary tank is provided to contain ethanol or E85. An injector directly injects in a separately controlled fashion ethanol or E85 into a cylinder of the engine to boost octane. A control module controls the relative amounts of gasoline and ethanol used and structure is provided for fueling the main and secondary fuel tanks.

15 Claims, 1 Drawing Sheet

U.S. PATENT DOCUMENTS

| | | | |
|---|---|---|---|
| 5,179,923 A | 1/1993 | Tsurutani et al. | |
| 5,233,944 A | 8/1993 | Mochizuki | |
| 5,331,994 A * | 7/1994 | Bryan et al. | 137/1 |
| 5,497,744 A | 3/1996 | Nagaosa et al. | |
| 5,560,344 A | 10/1996 | Chan | |
| 5,715,788 A | 2/1998 | Tarr et al. | |
| 5,911,210 A | 6/1999 | Flach | |
| 5,937,799 A | 8/1999 | Binion | |
| 5,983,855 A | 11/1999 | Benedikt et al. | |
| 6,032,632 A | 3/2000 | Bolenz et al. | |
| 6,073,607 A | 6/2000 | Liber | |
| 6,076,487 A | 6/2000 | Wulff et al. | |
| 6,098,584 A | 8/2000 | Ahner et al. | |
| 6,260,525 B1 | 7/2001 | Moyer | |
| 6,287,351 B1 | 9/2001 | Wulff et al. | |
| 6,298,838 B1 | 10/2001 | Huff et al. | |
| 6,321,692 B1 * | 11/2001 | Rayner | 123/1 A |
| 6,332,448 B1 | 12/2001 | Ilyama et al. | |
| 6,340,015 B1 | 1/2002 | Benedikt et al. | |
| 6,358,180 B1 | 3/2002 | Kuroda et al. | |
| 6,508,233 B1 | 1/2003 | Suhre et al. | |
| 6,513,505 B2 | 2/2003 | Watanabe et al. | |
| 6,536,405 B1 | 3/2003 | Rieger et al. | |
| 6,543,423 B2 | 4/2003 | Dobryden et al. | |
| 6,561,157 B2 | 5/2003 | zur Loye et al. | |
| 6,575,147 B2 | 6/2003 | Wulff et al. | |
| 6,622,663 B2 | 9/2003 | Weissman et al. | |
| 6,668,804 B2 | 12/2003 | Dobryden et al. | |
| 6,725,827 B2 | 4/2004 | Ueda et al. | |
| 6,745,744 B2 | 6/2004 | Suckewer et al. | |
| 6,748,918 B2 | 6/2004 | Rieger et al. | |
| 6,755,175 B1 | 6/2004 | McKay et al. | |
| 6,799,551 B2 | 10/2004 | Nakakita et al. | |
| 6,834,632 B2 | 12/2004 | Kataoka et al. | |
| 6,892,691 B1 | 5/2005 | Uhl et al. | |
| 6,951,202 B2 | 10/2005 | Oda | |
| 6,955,154 B1 | 10/2005 | Douglas | |
| 6,990,956 B2 | 1/2006 | Niimi | |
| 7,013,847 B2 | 3/2006 | Auer | |
| 7,021,277 B2 | 4/2006 | Kuo et al. | |
| 7,077,100 B2 | 6/2006 | Vogel et al. | |
| 7,077,105 B2 | 7/2006 | Oda et al. | |
| 7,086,376 B2 | 8/2006 | McKay | |
| 7,107,942 B2 | 9/2006 | Weissman et al. | |
| 7,156,070 B2 | 1/2007 | Strom et al. | |
| 7,159,568 B1 | 1/2007 | Lewis et al. | |
| 7,178,503 B1 | 2/2007 | Brehob | |
| 7,188,607 B2 | 3/2007 | Kobayashi | |
| 7,201,136 B2 | 4/2007 | McKay et al. | |
| 7,207,304 B2 | 4/2007 | Iwatsuki et al. | |
| 7,207,306 B2 | 4/2007 | Kondo | |
| 7,212,910 B2 | 5/2007 | Akasaka | |
| 7,225,787 B2 | 6/2007 | Bromberg et al. | |
| 7,263,959 B2 | 9/2007 | Kataoka et al. | |
| 7,287,492 B2 * | 10/2007 | Leone et al. | 123/1 A |
| 7,293,552 B2 | 11/2007 | Leone et al. | |
| 7,314,033 B2 * | 1/2008 | Cohn et al. | 123/198 A |
| 7,320,302 B2 | 1/2008 | Kobayashi | |
| 7,357,101 B2 * | 4/2008 | Boyarski | 123/1 A |
| 7,395,786 B2 | 7/2008 | Leone et al. | |
| 7,444,987 B2 * | 11/2008 | Cohn et al. | 123/431 |
| 2008/0115759 A1 * | 5/2008 | Russell | 123/198 F |
| 2008/0120008 A1 * | 5/2008 | Russell | 701/102 |

OTHER PUBLICATIONS

Julian A. LoRusso and Harry A. Cikanek, "Direct Injection Ignition Assisted Alcohol Engine," Society of Automotive Engineers, Inc., 880495, International Contress and Exposition in Detroit, Michigan (Feb. 29-Mar. 5, 1998).

Borje Grandin, et al., "Knock Suppression in a Turbocharged SI Engine by Using Cooled EGR," Society of Automotive Engineers, Inc., 982476, International Fall Fuels and Lubricants Meeting and Exposition in San Francisco, California (Oct. 19-22, 1998).

Borje Grandin and Hans-Erik Angstrom, "Replacing Fuel Enrichment in a Turbo Charged SI Engine: Lean Burn or Cooled EGR," Society of Automotive Engineers, Inc., 1999-01-3505.

C. Stan, et al., "Internal Mixture Formation and Combustion—from Gasoline to Ethanol," Society of Automotive Engineers, Inc., 2001-01-1207.

USPTO Non-Final Office Action, U.S. Appl. No. 10/991,774, filed Apr. 25, 2006.

USPTO Final Office Action, U.S. Appl. No. 10/991,774, filed Sep. 27, 2006.

USPTO Non-Final Office Action, U.S. Appl. No. 10/991,774, filed May 25, 2007.

USPTO Non-Final Office Action, U.S. Appl. No. 11/100,026, filed Aug. 3, 2006.

Fikret Yuksel and Bedri Yuksel, "The Use of Ethanol-Gasoline Blend as a Fuel in an SI Engine," Renewable Energy, vol. 29 (2004) pp. 1181-1191.

USPTO Non-Final Office Action, U.S. Appl. No. 11/229,755, filed Mar. 22, 2007.

USPTO Non-Final Office Action, U.S. Appl. No. 11/229,755, filed Oct. 4, 2007.

USPTO Non-Final Office Action, U.S. Appl. No. 11/682,372, filed Jan. 2, 2008.

USPTO Final Office Action, U.S. Appl. No. 11/682,372, filed Oct. 17, 2008.

USPTO Non-Final Office Action, U.S. Appl. No. 11/840,719, filed Jul. 11, 2008.

PCT International Search Report and Written Opinion, U.S. Appl. No. PCT/IB07/03004, Jul. 9, 2008.

PCT International Search Report and Written Opinion, Application No. PCT/US07/05777, Mar. 24, 2008.

PCT International Search Report and Written Opinion, Application No. PCT/US07/74227, Feb. 25, 2008.

PCT International Search Report and Written Opinion, Application No. PCT/US08/69171, Oct. 3, 2008.

PCT International Search Report and Written Opinion, Application No. PCT/US07/06142, Jul. 3, 2008.

J.B. Heywood, "Internal Combustion Engine Fundamentals," McGraw Hill, 1988, p. 477.

J. Stokes et al., "A gasoline engine concept for improved fuel economy - the lean-boost system," SAE paper 2001-01-2902, pp. 1-12.

H. J. Curran et al., "A comprehensive modeling study of iso-octane oxidation," Combustion and Flame 129:263-280 (2002) pp. 253-280.

B. Lecointe and G. Monnier, "Downsizing a gasoline engine using turbocharging with direct injection" SAE paper 200-01-0542.

USPTO Notice of Allowance, U.S. Appl. No. 11/684,100, Mar. 3, 2009.

PCT International Search Report and Written Opinion, Application No. PCT/US05/041317, Apr. 6, 2006.

USPTO Non-Final Office Action, U.S. Appl. No. 11/683,564, Mar. 13, 2009.

Chinese Intellectual Property Office Action, Application No. 200580046751.6, Dec. 19, 2008.

L. Bromberg et al., "Calculations of Knock Suppression in Highly Turbocharged Gasoline/Ethanol Engines Using Direct Ethanol Injection," Jul. 7, 2005, MIT Paper.

PCT International Search Report and Written Opinion, Application No. PCT/US06/012750, Jun. 28, 2007.

* cited by examiner

FUEL TANK SYSTEM FOR DIRECT ETHANOL INJECTION OCTANE BOOSTED GASOLINE ENGINE

This application claims priority to provisional application Ser. No. 60/780,981 filed Mar. 10, 2006, the contents of which are incorporated herein by reference.

BACKGROUND OF THE INVENTION

This invention relates to a fuel tank system for a direct ethanol injection octane boosted gasoline engine.

As described in U.S. patent application Ser. No. 10/991,774 filed on Nov. 18, 2004 and application Ser. No. 11/100,026 filed Apr. 6, 2005, on-demand octane boost using direct ethanol injection can be used to enable high fuel economy in two types of vehicle operation. The contents of these applications are incorporated herein by reference. In the first, the vehicle is essentially powered by gasoline (with a minimal amount of ethanol used for on-demand octane boost). In another mode of operation when the cost and availability of ethanol make its use attractive, the vehicle is powered by a flexible fuel mix of E85 and gasoline. In this case, the E85 can constitute up to 100% of the fuel. In contrast to the use of ethanol as a fuel that is blended with gasoline, the driver has the freedom to determine when and how much ethanol to use. As will be described below, the amount of ethanol or E85 required to be stored in a separate tank for on-demand octane boost is on the order of only 4 to 20 gallons per year when a vehicle is essentially powered by gasoline. The requirement is less when the vehicle is powered by a flexible fuel mixture of ethanol or E85 and gasoline. The ethanol can be added using either 1.0 to 2.5 gallon containers or by the use of a pump at the growing number of E85 fueling stations in the United States. This small amount of ethanol could be provided for 50 million vehicles using less than 1 billion gallons of ethanol per year which is about 25% of the present U.S. ethanol production. Thus, the required extension of the ethanol transportation fuel infrastructure is very modest. Moreover, with the substantial increase in E85 infrastructure as presently planned by the 2005 Energy Act, additional ethanol can be used as a substitute fuel in addition to its use as an on-demand octane boost agent.

An object of the present invention is to minimize the inconvenience and cost of using a separate tank for the on-demand octane boost agent. Another object is a fuel management system designed so as to reduce the additional cost of flexible fuel operation.

SUMMARY OF THE INVENTION

The fuel tank system according to the invention for a direct ethanol injection octane boosted gasoline engine includes a gasoline engine and a main fuel tank for gasoline or E85. A smaller, secondary tank (octane boost tank) is provided to store ethanol or E85. An injector is provided for direct, separately controlled injection of ethanol or E85 into a cylinder of the engine to boost octane. A control module controls the relative amounts of gasoline and ethanol used and means for fueling the main and secondary fuel tanks is provided. In one embodiment, the means for fueling includes a single spigot with dual lines. In another embodiment, a first fuel inlet fitting is provided that accepts a nozzle that dispenses gasoline or E85 and a second fuel inlet fitting is provided that accepts a nozzle that dispenses ethanol or E85. In yet another embodiment, the smaller secondary tank is fueled from a container or a pump. Suitable containers have volumes of 1.0 to 2.5 gallons. The system can further include a valve allowing both tanks to be filled from a single inlet fitting.

In yet another embodiment, the control module reduces the amount of ethanol or E85 from the secondary tank injected into the engine when the main tank contains E85. In another embodiment, the means for refueling refuels the main and secondary tanks simultaneously from a single fuel spigot having a nozzle design allowing gasoline into the main tank and ethanol into the secondary tank. It is also preferred that the capacities of the main and secondary tanks can be reconfigured. Such a reconfiguring may be on the basis of a previous driving pattern with an operator override. It is preferred that the engine be operated at a substantially stoichiometric air/fuel ratio so that 3 way catalytic converters can be used. In yet another embodiment, engine pressure boost, torque or horsepower is decreased to reduce consumption of ethanol.

DESCRIPTION OF THE PREFERRED EMBODIMENT

Figure 1:
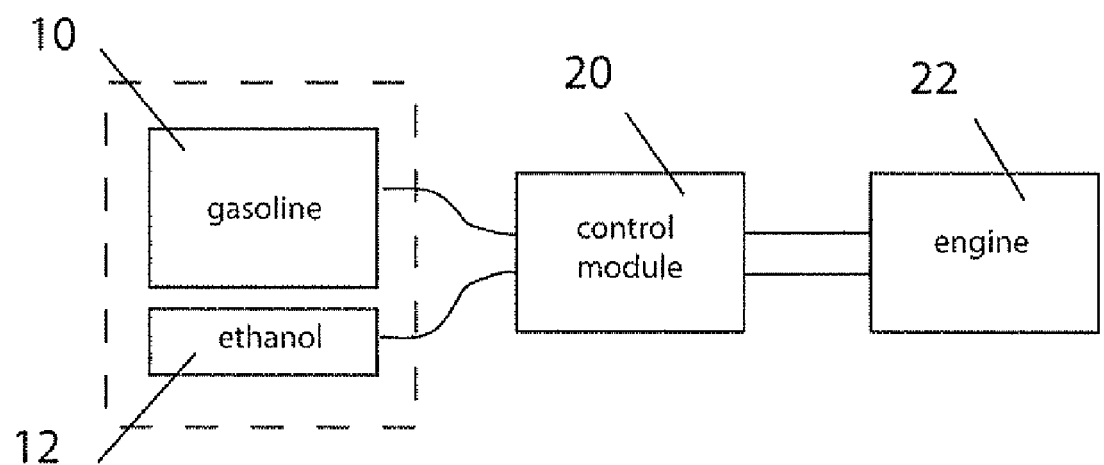
FIG. 1 is a block diagram illustrating an embodiment of the invention.
Figure 2:
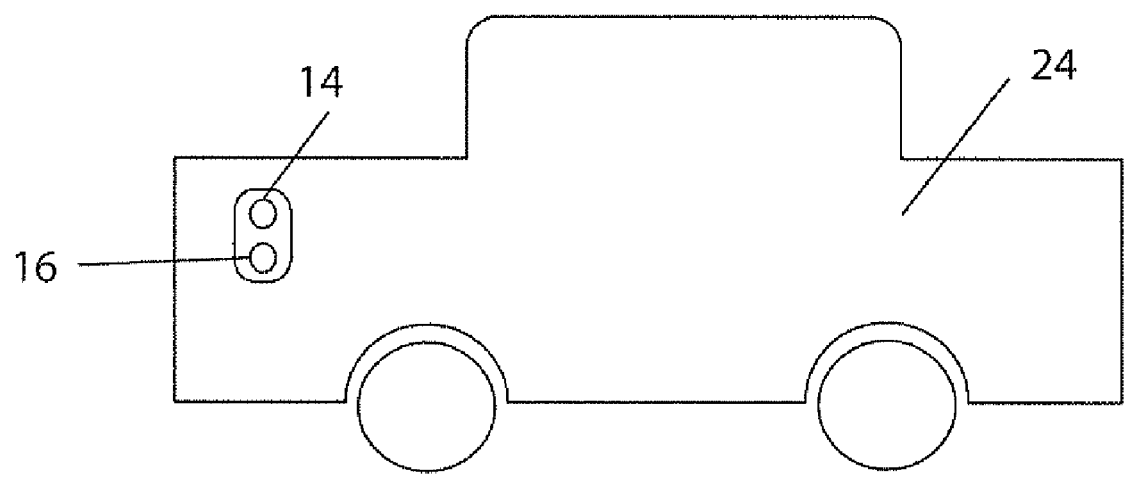
FIG. 2 is a schematic illustration of an embodiment of the fueling system disclosed herein.

The fuel tank system disclosed herein uses a small separate fuel tank as a source of ethanol or E85 while the primary tank contains gasoline, E85, ethanol or a combination of these fuels. FIGS. 1 and 2 illustrate the fueling arrangement for a primary gasoline tank 10 and a secondary ethanol tank 12. The small separate ethanol tank 12 is referred to as the secondary tank or octane boost tank. As shown in FIG. 2 there is one fuel inlet fitting 14 for E85 or ethanol and another fitting 16 for gasoline. The E85 fuel inlet fitting 14 is compatible with the pump nozzle that is currently used at E85 fueling stations. As shown in FIG. 1 the two tanks 10 and 12 could be integrated together into one unit 18. Delivery of gasoline and ethanol from the integrated unit 18 is under the control of a control module 20 for delivery to an engine 22 that powers a vehicle 24.

The octane boost tank 12 can be fueled from 1.0 or 2.5 gallon containers or by use of a pump. The refilling by containers can be carried out either by the driver or by a mechanic at the time of an oil change as part of routine servicing since the interval for ethanol refill could be on the order of three months or more.

The E85 fuel inlet fitting 14 can also accommodate E85 or ethanol that is added by containers in combination with a pour spout that could be screwed on to the container. Such a pour spout would be similar to the pour spout that is attached to present 2.5 gallon containers.

The octane boost tank 12 is sized so that the refill interval can generally be as long as three or more months under normal driving conditions. For example, a total fuel tank with a capacity of 22 gallons might have a capacity of 6 gallons for the octane boost tank 12 and 16 gallons for the gasoline tank 10. Because of the increased fuel efficiency from the on-demand direct injection octane boost, this 16 gallon gasoline tank configuration will not lead to any decrease in range relative to a conventional 20 gallon gasoline tank.

Based upon the computational model described in the above identified pending applications, the required amount of ethanol or E85 to provide the on-demand octane boost for a 20% to 30% improvement in fuel economy is between 1 and 5 gallons for every 100 gallons of gasoline. The on-demand octane boost allows an increase in manifold pressure by a factor of 1.8 or more.

By way of illustration, assuming an annual gasoline consumption rate of 400 gallons a year (12,000 miles per year at 25 miles per gallon), the ethanol or E85 consumption rate is between 4 and 20 gallons a year, corresponding to 0.3 to 1.7 gallons per month. A representative consumption rate could thus be 1 gallon per month under normal driving conditions. Therefore, the use of a 6 gallon tank would allow for an ethanol or E85 refill interval of three months or more. This is approximately the same time interval as that for an oil change.

With E85 or ethanol comprising part, or even all of the fuel in the primary fuel tank 10, the consumption of E85 or ethanol from the on-demand octane boost fuel tank 12 to prevent knock would be reduced. Hence the rate of use of E85 or ethanol from the on-demand octane boost tank 12 could be accordingly reduced and the refill interval for this tank can thus be extended.

The amount of E85 or ethanol drawn from the secondary fuel tank 12 can also be reduced by the control module 20 that may be activated by a driver. In this case, turbocharging, torque and/or horsepower capability would be decreased in order to reduce the demand for E85 or ethanol needed to insure knock free operation. This "octane boost economy" mode can also increase the refuel time interval and/or reduce the amount of E85 or ethanol that would be needed to be added at any time to the octane boost tank 12 at the expense of decreased power.

The control module 20 also controls, in one embodiment, the air/fuel mixture to provide substantially stoichiometric operation both during the time that the on-demand direct injection octane boost is used and when flexible fuel operation with ethanol or E85 in the primary tank 10 is employed. Stoichiometric operation makes it possible to use a three way catalytic converter which is highly effective in reducing emissions of pollutants in the engine 22 exhaust. Those skilled in the art will recognize that fuel injectors used for direct E85 or ethanol injection from the smaller tank 12 can also be used for injection of gasoline or E85 from the primary tank 10.

If the price and availability of E85 are such as to motivate greater use in a flexible fuel mode, the octane boost tank 12 and the primary fuel tank 10 can be simultaneously fueled. In this way the time interval for separate refueling of the octane boost tank 12 is additionally lengthened. This mode can be accomplished by opening a valve (not shown) which allows E85 to flow into the main tank 10 in addition to the octane boost tank 12. The valve can be controlled by a switch activated by the driver.

Another option for providing convenient pump refueling is to use a single spigot. In order to make it transparent to the driver, a single spigot with dual lines to the refueling station could be used to fill simultaneously both the main fuel tank 10 and the octane boost tank 12. Such a system is similar to that proposed for diesel/SCR operation, but using gasoline/ethanol instead.

It is preferred to use a single spigot that refuels both the main fuel tank 10 and the on-demand octane boosting tank 12 in which the vehicle 24 determines how much of each fuel is needed, and the refueling station adjusts the rate and amount of fuel that is introduced into the vehicle. In this case, the vehicle 24 automatically determines how much fuel and ethanol octane enhancement is available, and how much is needed, assuming a pattern of driving that could include an onboard expert system that analyzes previous driving patterns.

The system disclosed herein can be arranged so that the onboard fuel management system reconfigures the fuel tank, adjusting the size of the respective tanks in order to provide the appropriate ratio of antiknock fuel to main fuel, with the refueling system just filling both tanks to capacity. This refueling can be achieved either with a single spigot with dual fuel dispensers, separated feeds, or a single feed with a valve to switch tank being refueled. This mode would be particularly useful for those engine designs and/or driving patterns that require substantial amounts of octane boosting agent.

The most transparent adjustment of the tank configuration (ratio of the capacities of the main fuel tank 10 and the on-demand octane boost tank 12) occurs if the operation is done automatically by the fuel management control module 20. However, the system can be most flexible if the operator can adjust the ratio, overriding the instructions from the control module 20 in order to best match future driving patterns (for example, before starting on a long trip with a highway driving pattern, or, conversely, after a long drive and readjusting to a city driving pattern).

Those skilled in the art will recognize that the above discussion applies to methanol and M85 as well as ethanol and ethanol blends such as E85.

It is recognized that modifications and variations will occur to those of ordinary skill in the art and it is intended that all such modifications and variations be included within the scope of the appended claims.

What is claimed is:

1. A system for a direct ethanol injection octane boosted gasoline engine comprising:
   a gasoline engine;
   a main fuel tank that contains gasoline or a mix of gasoline and E85;
   a smaller secondary tank containing E85;
   an injector for separately controlled, direct injection of E85 from the secondary tank into a cylinder of the engine to boost octane;
   a control module to control the relative amounts of gasoline and ethanol used; and
   means for fueling the main and secondary fuel tanks; wherein the control module reconfigures the capacities of the main and secondary fuel tanks.

2. The system of claim 1 wherein the means for fueling includes a single spigot with dual lines.

3. The system of claim 1 further including a first fuel inlet fitting accepting a nozzle that dispenses gasoline or E85, and a second fuel inlet fitting accepting a nozzle that dispenses E85.

4. The system of claim 1 wherein the smaller secondary tank is fueled by a container.

5. The system of claim 4 wherein the container has a capacity of 1.0 to 2.5 gallons.

6. The system of claim 1 where in the smaller secondary tank is fueled by a pump.

7. The system of claim 1 further including a valve allowing both tanks to be filled through use of a single inlet fitting.

8. The system of claim 1 wherein the control module reduces the amount of E85 injected into the engine when the main tank contains E85 or gasoline/E85 mixtures.

9. The system of claim 1 wherein the means of fueling refuels the main and secondary tanks simultaneously from a single dual fuel spigot having a nozzle design allowing gasoline into the main tank and ethanol into the secondary tank.

10. The system of claim 1 wherein the control module controls the reconfiguration on the basis of a previous driving pattern.

11. The system of claim 10 further including operator override of the control module to meet expected driving patterns.

12. The system of claim 1 wherein the engine is operated at a substantially stoichiometric air/fuel ratio.

13. The system of claim 1 wherein the direct injector also injects gasoline or E85 from the main tank.

14. The system of claim 1 wherein engine boost pressure, torque or horsepower is decreased to reduce consumption of E85.

15. A system for a direct ethanol injection octane boosted gasoline engine comprising:
   a gasoline engine;
   a main fuel tank that contains gasoline or a mix of gasoline and E85;
   a smaller secondary tank containing E85;
   an injector for direct, separately controlled, injection of E85 from the secondary tank into a cylinder of the engine to boost octane;
   a control module to control the relative amounts of gasoline and ethanol used; and
   means for fueling the main and secondary fuel tanks wherein the control module reconfigures the capacities of the main and secondary fuel tanks, and
   wherein the injector for direct injection of E85 from the secondary tank is also used to inject gasoline or E85 from the first tank and
   wherein the fuel/air mixture is substantially stoichiometric.

* * * * *